(12) United States Patent
Tomaselli et al.

(10) Patent No.: US 9,135,681 B2
(45) Date of Patent: Sep. 15, 2015

(54) IMAGE CHROMA NOISE REDUCTION

(75) Inventors: Valeria Tomaselli, Belpasso (IT); Mirko Guarnera, San Giovanni La Punta (IT); Gregory Roffet, Coublevie (FR)

(73) Assignees: STMicroelectronics S.r.l., Agrate Brianza (IT); STMicroelectronics (Grenoble 2) SAS, Grenoble (FR)

( * ) Notice: Subject to any disclaimer, the term of this patent is extended or adjusted under 35 U.S.C. 154(b) by 189 days.

(21) Appl. No.: 13/608,783

(22) Filed: Sep. 10, 2012

(65) Prior Publication Data

US 2013/0064448 A1 Mar. 14, 2013

(30) Foreign Application Priority Data

Sep. 9, 2011 (IT) .......................... VI2011A000243

(51) Int. Cl.
*G06K 9/40* (2006.01)
*G06T 5/00* (2006.01)
*G06T 5/20* (2006.01)
*H04N 1/409* (2006.01)

(52) U.S. Cl.
CPC . *G06T 5/002* (2013.01); *G06T 5/20* (2013.01); *H04N 1/409* (2013.01); *G06T 2207/10024* (2013.01); *G06T 2207/20192* (2013.01)

(58) Field of Classification Search
None
See application file for complete search history.

(56) References Cited

U.S. PATENT DOCUMENTS

| 3,778,543 | A | 12/1973 | Lowry |
| 5,920,356 | A | 7/1999 | Gupta et al. |
| 6,621,937 | B1 | 9/2003 | Adams, Jr. et al. |
| 6,980,326 | B2 | 12/2005 | Tsuchiya et al. |
| 6,990,249 | B2 | 1/2006 | Nomura |
| 7,084,906 | B2 | 8/2006 | Adams et al. |
| 7,511,769 | B2 | 3/2009 | Renner et al. |
| 7,529,405 | B2 | 5/2009 | Masuno et al. |
| 8,014,627 | B2 * | 9/2011 | Guan ........................... 382/275 |
| 2002/0037101 | A1 | 3/2002 | Aihara |
| 2004/0070677 | A1 * | 4/2004 | Adams et al. .............. 348/222.1 |

(Continued)

FOREIGN PATENT DOCUMENTS

| EP | 1093087 A2 | 4/2001 |
| EP | 1289309 A1 | 3/2003 |

(Continued)

OTHER PUBLICATIONS

Tomaselli et al.,"False colors removal on the YCrCb color space," Jan. 20, 2009, pp. 72500C-1-72500C-10, SPIE-IS&T, vol. 7250.

(Continued)

*Primary Examiner* — Sean Motsinger
(74) *Attorney, Agent, or Firm* — Seed IP Law Group PLLC

(57) ABSTRACT

An embodiment of a method for reducing chroma noise in digital image data and of a corresponding image processor. Chrominance components are subjected to low-pass filtering. The strength of the low-pass filtering is modulated in accordance with the dynamic range of the luminance signal and the dynamic range of each of the two chrominance signals in order to avoid color bleeding at image-object edges. Moreover, the low-pass filtering is selectively applied to pixels with similar luminance and chrominance values only. A combination of down-sampling and up-sampling units is employed so that comparatively small filter kernels may be used for removing chroma noise with low spatial frequency.

16 Claims, 4 Drawing Sheets

(56) References Cited

U.S. PATENT DOCUMENTS

| | | | |
|---|---|---|---|
| 2006/0017855 | A1 | 1/2006 | Yamada |
| 2006/0232709 | A1 | 10/2006 | Renner et al. |
| 2007/0153341 | A1 | 7/2007 | Kang et al. |
| 2008/0292209 | A1 | 11/2008 | Vakrat |
| 2010/0027886 | A1 | 2/2010 | Kang |
| 2010/0141809 | A1 | 6/2010 | Fukutomi et al. |
| 2010/0309344 | A1 | 12/2010 | Zimmer et al. |
| 2010/0309345 | A1 | 12/2010 | Zimmer et al. |
| 2011/0052053 | A1* | 3/2011 | Tomaselli et al. ............ 382/167 |
| 2012/0194719 | A1* | 8/2012 | Churchwell et al. ......... 348/302 |
| 2012/0237124 | A1 | 9/2012 | Bosco et al. |

FOREIGN PATENT DOCUMENTS

| | | |
|---|---|---|
| JP | 2006-14261 A | 1/2006 |
| WO | 03/051035 A1 | 3/2015 |

OTHER PUBLICATIONS

Search Report for Italian Application No. VI20110052, Minestero dello Sviluppo Economico, Munich, Jan. 16, 2012, 7 pages.

A. Bosco et al.: "Texture Sensitive Denoising for Single Sensor Color Imaging Devices", Computational Color Imaging, Springer Berlin Heidelberg, Berlin, Heidelberg. vol. 5646, Mar. 6, 2009, pp. 130-139.

A. Bosco et al.: "Adaptive Temporal Filtering for CFA Video Sequences". Proceedings of ACIVS (Advanced Concepts for Intelligent Vision Systems), Ghent, Belgium, Sep. 9-11, 2002, pp. 19-24.

C. Tomasi et al.: "Bilateral Filtering for Gray and Color Images", in Proc. Int. Conf. Computer Vision, 1998, pp. 839-846.

U.S. Appl. No. 13/421,799, filed Mar. 15, 2012 entitled "Image Chroma Noise Reduction in the Bayer Domain."

Multiresolution bilateral filtering for image denoising by M. Zhang and B. K. Gunturk (IEEE Transactions on Image Processing, vol. 17, No. 12, Dec. 2008).

* cited by examiner

US 9,135,681 B2

IMAGE CHROMA NOISE REDUCTION

PRIORITY CLAIM

The instant application claims priority to Italian Patent Application No. VI2011A000243, filed Sep. 9, 2011, which application is incorporated herein by reference in its entirety.

TECHNICAL FIELD

An embodiment relates to digital-image processing, in particular to a method for reducing chroma noise in digital-image data, and to a corresponding image processor.

BACKGROUND

There are different sources of noise in digital images acquired by image sensors in digital cameras, camcorders, and scanners, including fixed-pattern noise and temporal noise. Many factors determine the overall noise characteristics in an image: sensor type, pixel dimensions, temperature, exposure time, etc. Noise can also vary within an individual image. For digital cameras, darker regions may contain more noise than the brighter regions. Moreover, noise is space varying and channel dependent. The blue channel is usually the noisiest channel. Classical noise-reduction techniques remove noise from the Bayer image, before the color interpolation step. Thus, they often assume the noise to be uncorrelated for different pixels. The amount of noise which is not removed by the noise reduction technique is often spread in a neighborhood by the color-interpolation algorithm, which infers missing color components. Consequently, noise may have low-frequency (coarse-grain) and high-frequency (fine-grain) variations. High-frequency noise is relatively easier to remove than low-frequency noise, which may be difficult to distinguish from the real image signal. Moreover, noise is composed of two elements: fluctuations in color and luminance. Color or "chroma" noise is usually more unnatural in appearance than luminance noise, and can render images unusable if not kept under control. This kind of noise may appear as low-frequency, colored blobs in regions of low spatial frequency. These colored blobs may be irregularly shaped and are typically around 5 to 25, or more, pixels wide in a given direction, and usually are more pronounced in darker regions than in brighter regions.

A conventional approach to chroma-noise reduction is disclosed in U.S. Pat. No. 6,980,326, which is incorporated by reference. This approach includes using standard gray-scale image-noise-reduction techniques on each color channel separately, thus ignoring any interactions or correlations between the color channels. This technique can produce an excessive desaturation of genuine chrominance details. Early state-of-the-art techniques for removing chroma-noise artifacts usually convert the image into a luminance-chrominance space (YCrCb or CIELAB), apply some simple, but effective, methods such as mean, smoothing, or median filtering to the chrominance channels, and then convert the image back to the original color space. A shortcoming of this approach is that there is no discrimination between false colors and genuine chrominance details. Consequently, sharp, colored edges in the image begin to bleed color as the blurring becomes more aggressive. The problem of color bleeding can be contained using a small, fixed-blur kernel. But to remove low-frequency chroma blobs, large blur kernels are typically required.

U.S. Pat. No. 7,084,906, which is incorporated by reference, addresses the problem of removing color moiré artifacts from images by blurring chrominances in low-frequency activity neighborhoods, excluding edges. Down-sampled luminance and chrominance signals are used to separate the image into textured and non-textured regions. In particular, a binary texture map, which identifies low-frequency activity (LFA) areas, is constructed by threshold, erosion, and dilation operations. The average of the chrominances belonging to the LFA area within a 7×7 spider-shaped region is computed, thus removing color moiré artifacts. Also, to clean the non-textured regions of the image, a simple sigma filtering of the chroma channels is performed in a 3×3 support region (9×9 at the original pixel resolution). In particular, the absolute difference in chrominance between each neighboring pixel and the central pixel is computed. If both chroma channel values are within a threshold (usually set to 10 for 8-bit images), then the pixel is included in the cleaning calculations. This means that chroma noise is reduced by averaging pixels which have very similar chrominance values to the central one, thus avoiding color bleeding.

EP Patent 1093087 A2, which is incorporated by reference, provides a solution for reducing chroma noise with the use of large blur kernels without causing color bleeding at sharp, colored edges. More specifically, the disclosed technique firstly identify all the edges and boundaries in the image, and then allows a calculation-neighborhood region to adaptively grow until it encounters an edge. To create the edge map, four edge-detector filters are convolved with each channel (Lab), and the results are added together. Then the algorithm moves out in each of the eight compass directions, one pixel at a time, examining the edge-map values. If the difference between an edge-map value and the central-pixel value is less than a threshold, then that pixel is added to the smoothing neighborhood; otherwise, the growth of the smoothing region in that direction is stopped. A maximum radius value might be in the range of about 50 to 100 pixels. Within the smoothing region, the a and b channels are averaged. Eventually, the image is converted back to the original color space.

In the article "Multiresolution bilateral filtering for image denoising" by M. Zhang and B. K. Gunturk (IEEE Transactions on Image Processing, vol. 17, no. 12, December 2008), which is incorporated by reference, a multi-resolution technique is proposed to remove noise from images, because it is possible to distinguish between noise and image information better at one resolution level than another. Coarse-grain noise becomes fine-grain as the image is decomposed further into its subbands, and, hence, it could be eliminated at a lower level. The proposed framework decomposes the noisy signal into its frequency subbands with wavelet decomposition; as the signal is reconstructed back, bilateral filtering is applied to the approximation subbands. In addition, it is possible to apply wavelet thresholding to the detail subbands. As the number of decomposition levels increases, chroma noise is better removed, but bleeding effects increase as well.

SUMMARY

An embodiment removes color noise from digital images without generating color-bleeding artifacts. Furthermore, an embodiment removes colored blobs from digital images by using a system with reduced complexity and memory requirements.

An embodiment applies a low-pass filter to the chrominance signals of the image, and modulates the strength of the low-pass filtering in accordance with the dynamic range of the luminance signal and the chrominance signals.

According to an embodiment, a method for reducing chroma noise in digital image data is provided. The embodiment includes receiving a luminance signal representing luminance of a plurality of pixels; receiving a first chrominance signal representing a first chrominance plane of the plurality of pixels; receiving a second chrominance signal representing a second chrominance plane of the plurality of pixels; determining a dynamic range of the first chrominance signal, a dynamic range of the second chrominance signal, and a dynamic range of the luminance signal; applying a low-pass filter to the first chrominance signal; computing a weighting coefficient on the basis of the dynamic ranges of the first chrominance signal, the second chrominance signal, and the luminance signal; and generating a first output chrominance signal by computing a weighted sum of the received first chrominance signal and the low-pass filtered first chrominance signal, on the basis of the computed weighting coefficient.

According to an embodiment, an image processor for reducing chroma noise in digital image data is provided. The image processor includes a dynamic-range calculation section for determining a dynamic range of a first chrominance signal representing a first chrominance plane of a plurality of pixels, a dynamic range of a second chrominance signal representing a second chrominance plane of the plurality of pixels, and a dynamic range of a luminance signal representing luminance of the plurality of pixels; a filter unit for applying a low-pass filter to the first chrominance signal; a weighting-coefficient calculation section for computing a weighting coefficient on the basis of the dynamic ranges of the first chrominance signal, the second chrominance signal, and the luminance signal; and a weighted-sum calculation section for generating a first output chrominance signal by computing a weighted sum of the received first chrominance signal and the low-pass filtered first chrominance signal, on the basis of the computed weighting coefficient.

According to an embodiment, a digital camera includes an image processor as described above.

In an embodiment, the weighting coefficient is computed by applying a decreasing function to the dynamic range of the luminance signal, if the dynamic range of the luminance signal is smaller than the dynamic range of the first chrominance signal and the second chrominance signal, and by applying the decreasing function to the maximum of the dynamic range of the luminance signal, the first chrominance signal, and the second chrominance signal, if the dynamic range of the luminance signal is not smaller than the dynamic range of the first chrominance signal or the second chrominance signal; wherein the weighted sum is computed by weighting the low-pass-filtered first chrominance signal with the computed weighting coefficient. In this manner, the chroma filtering is restricted to flat-image areas, i.e., image areas without significant edges, so that color bleeding is effectively prevented.

In another embodiment, the low-pass filter is applied to the first chrominance signal by computing a weighted average of the first chrominance signal for pixels within a neighborhood of a central pixel, each weight of the weighted average being a decreasing function of a difference between a luminance of a respective pixel within said neighborhood and a luminance of the central pixel, as well as a decreasing function of a difference between a first chrominance plane of the respective pixel and a first chrominance plane of the central pixel, wherein the computed weighted average is set as the low-pass-filtered first chrominance signal for the central pixel. According to this structure, chroma filtering is restricted to pixels with similar luminance and chrominance values.

The size of the neighborhood of the central pixel may be set on the basis of at least one of an ISO setting, an exposure time, a luminance of the central pixel, and an average luminance of pixels adjacent to the central pixel. In this manner, the strength of the chroma denoising may be adapted to the imaging conditions and dark image areas may be subjected to a more effective chroma denoising than bright image areas.

The decreasing function may be a sigmoidal function with values between zero and one.

According to an embodiment, the luminance signal and the first chrominance signal are down-sampled prior to applying the low-pass filter to the down-sampled first chrominance signal. The low-pass-filtered signal may then be up-sampled to obtain the low-pass-filtered first chrominance signal. In this manner, comparatively small filter kernels may be employed for removing chroma noise with a low spatial frequency. This translates directly into more relaxed hardware requirements, in particular in terms of memory size and computational power.

Moreover, an additional denoising filter may be applied to the up-sampled signal to obtain the low-pass-filtered first chrominance signal. In this manner, chroma noise may effectively be reduced at two different length scales and spatial-frequency ranges.

BRIEF DESCRIPTION OF THE DRAWINGS

One or more embodiments are given in conjunction with the accompanying drawings, in which.

DETAILED DESCRIPTION

Figure 1:
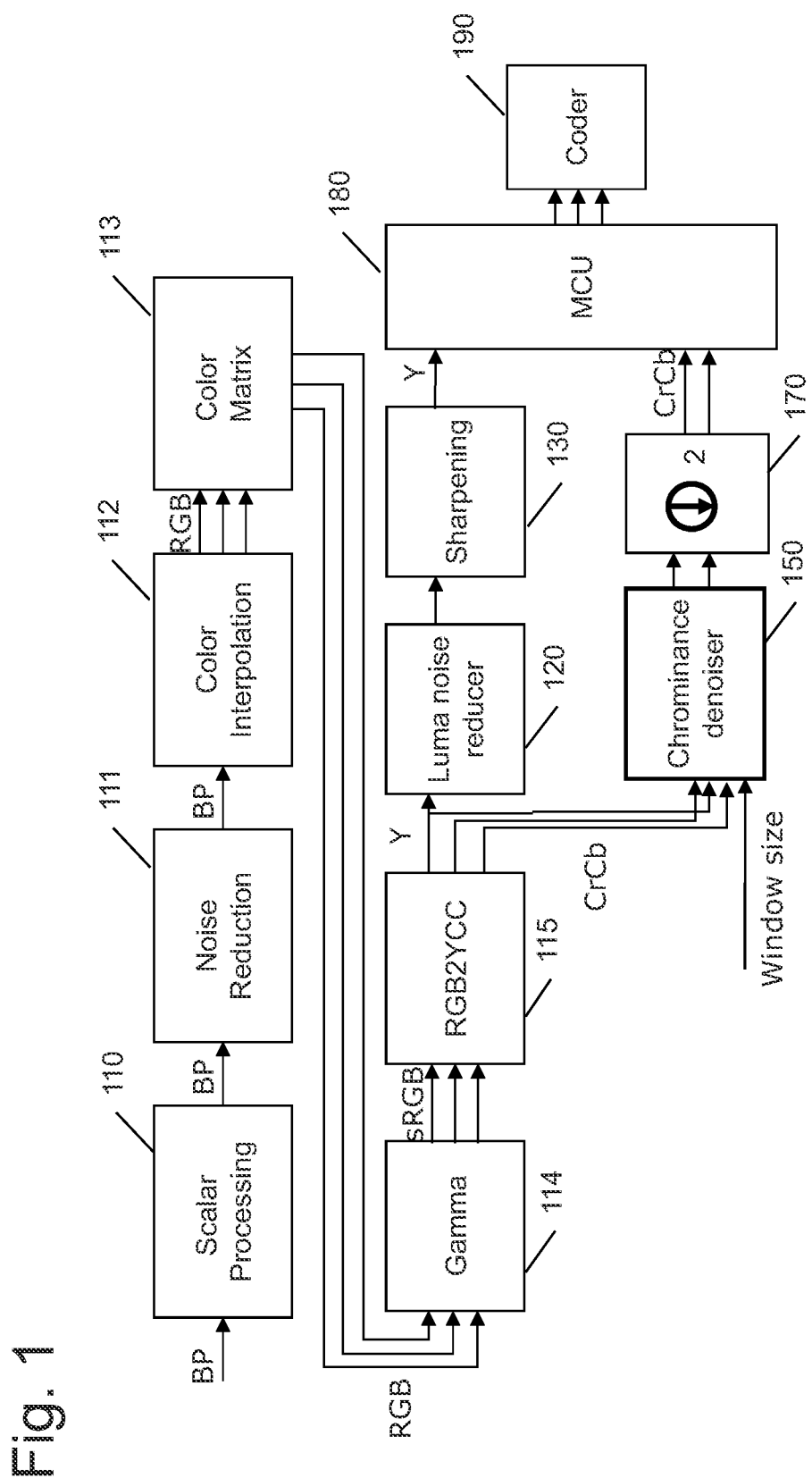
FIG. 1 is a block diagram showing a configuration of an image-processing apparatus in accordance with an embodiment.

FIG. 1 is a block diagram showing a configuration of an image-processing apparatus in accordance with an embodiment. The image-processing apparatus receives raw image data (Bayer pattern, BP) and applies scalar processing 110, noise reduction 111, and color interpolation 112 in order to obtain digital image data in the RGB (red, green, blue) domain. After color matrix 113 and gamma processing 114, the image data is converted into a luminance-chrominance domain (e.g., YCrCb, wherein Y is the luma component and Cr and Cb are the red-difference and blue-difference chroma components) by means of a converter unit 115. The luminance component (Y) is subjected to a separate processing in order to reduce luma noise 120 and to sharpen the image 130. The chrominance components, on the other hand, are subjected to a dedicated chroma-noise-reduction processing 150, which will be described in greater detail below.

Block 170 performs chrominance down-sampling before JPEG encoding. The ratios at which the down-sampling is usually performed for JPEG images is 4:4:4 (no down-sampling), 4:2:2 (reduction by a factor of 2 in the horizontal direction) or the most common 4:2:0 (reduction of a factor of 2 in both the horizontal and vertical directions). Every JPEG image is stored as a series of compressed image tiles, named Minimum Coded Unit (MCU). The Minimum Coded Unit size for JPEG images is usually 8×8 (4:4:4), 16×8 (4:2:2) or 16×16 (4:2:0) pixels. The partitioning of the image data into MCUs is performed in an MCU block 180. The individual MCUs are then provided to coder block 190 for JPEG encoding.

The chrominance denoiser 150 works on the YCbCr (or YUV, Lab) domain. In an embodiment, the denoiser 150 is placed after the RGB-to-YCbCr conversion. The color-space conversion does not increase the complexity of the proposed system, since it is in any case performed to achieve the JPEG compression. Since chrominance noise can be removed by filtering the chrominance planes only, the chroma-noise reduction may be performed while the luminance is processed by a luminance-noise reducer (if it is needed) and an edge-enhancing step, as it is shown in FIG. 1. Although luminance is provided as an input to the chrominance denoiser 150, it is not modified inside this block, but it is used to modulate the strength of the filter to be applied on chrominances. Moreover, the power of the chrominance-denoising filter 150 depends also on the filter size (window size), which is provided as an input to the chrominance denoiser 150. The window size may be a fixed value, or may depend on the exposure parameters, analog gain, ISO settings, etc. Moreover, the window size may also vary according to the intensity value of the pixel being processed, or the average intensity value in a neighborhood.

As explained above, the luminance plane is not modified within the chrominance denoiser 150, but is provided in order to modulate the strength of the filter to be applied on the chrominances. In an embodiment, denoising should be stronger on flat image areas, avoiding filtering of chrominance signals on edge areas. Instead of blurring the chrominance planes through a simple average filter, a weighted average filter may be applied, giving higher weights to neighboring pixels which are more similar to the central one, thus avoiding the inclusion of edge pixels in the average process. Moreover, in order to reduce color-bleeding artifacts, an embodiment may avoid the separate filtering of the two chrominance planes. For this reason, the dynamic chromatic ranges (DCr and DCb) and the dynamic luminance range (DY) are evaluated in a N×N neighborhood of the pixel to be corrected. For each pixel of interest, dynamic luminance and chrominance ranges may be computed as the difference between the maximum and the minimum value in the local neighborhood, as it is expressed in Eq. (1).

$$DCr = \max_I(Cr) - \min_I(Cr) \quad (1)$$
$$DCb = \max_I(Cb) - \min_I(Cb)$$
$$DY = \max_I(Y) - \min_I(Y)$$

where I (N×N) is the local neighborhood of the central pixel, which may, for instance, be a 5×5 window.

Both the dynamic chromatic and luminance ranges may be used to calculate a parameter, named Cf, which determines the strength of the filter on chrominances. In an embodiment, in the presence of a sharp edge, any filtering action is avoided. On the other hand, if the region is flat, in an embodiment the denoising action is stronger. In order to achieve this effect, the following equation may be used:

$$Cf = \begin{cases} DY & \text{if } DY = \min(DY, DCr, DCb) \\ \max(DY, DCr, DCb) & \text{otherwise} \end{cases}$$

The Cf value, which may be a value ranging from 0 to 255 (for 8-bit images), determines the power of the chroma-noise reduction, according to equation (3), $$Cr_k = originalCr_k + f(Cf) \cdot \left(denoisedCr_L - originalCr_k\right) \quad (3)$$
$$Cb_k = originalCb_k + f(Cf) \cdot \left(denoisedCb_L - originalCb_k\right)$$

In this context, f(x) is a weighting coefficient, for example, a decreasing function of x, with values ranging from zero to one. In an embodiment, f(x) is defined as $$f(x) = e^{-\frac{1}{2}\left(\frac{x}{sigma}\right)^2} \quad x \in [0, \text{max value}] \quad (4)$$

Sigma, which, for example, may have a value of approximately 10, determines how fast f(x) approaches 0. It is straightforward to note that equation (3) updates each chrominance value with a weighted average of the original chrominance value (originalCr$_k$ and originalCb$_k$) and the denoised value (denoisedCr and denoisedCb) of the chrominance in the neighborhood L ("k" represents a pixel in the neighborhood L). In an embodiment, the size of the neighborhood L may be made dependent on the exposure parameters. In particular, the size of the neighborhood (window size) can increase as the exposure time becomes greater, because chroma noise more heavily affects dark images. As an example of the relationship between window size and exposure time, the window size for chrominance-noise removal may increase in a logarithmic way with respect to the exposure time. However, other (increasing) functions, including a linear relation or a quadratic relation may be used as well.

The window size L also can depend on analog gain, ISO settings, etc., and, moreover, it can vary according to the intensity value of the pixel being corrected (darker pixels can be filtered with greater window sizes) or according to the average luminance intensity in a certain neighborhood of the current pixel.

As explained above, the weight between original and denoised values depends on the Cf parameter, through the function f(x). With reference to equation (3), low values of the Cf parameter imply a greater contribution of the denoised chrominance value. On the contrary, as Cf increases, a higher weight is assigned to the original value, reducing color bleeding in the presence of edges. The function f(x) avoids discontinuous corrections when dynamic ranges change. In fact, proportions of both the original value and the denoised value are continuously varied to form the final value. This soft-threshold methodology avoids abrupt transitions between corrected and non-corrected pixels, thus producing higher-quality images. Moreover, both chrominance values are corrected according to the same f(Cf) value, and hence the same proportions of denoised and original values are used to correct both chrominance planes. This means that each chrominance value is not corrected independently from the other, but the color correlation is taken into account, thus reducing the risk for color bleeding even further.

Denoised chrominances are calculated through an appropriately weighted average of the surrounding chrominance values, as it is shown in Eq. (5), with k being the index of the generic element within an L neighborhood (M×M size), with k∈[1,M×M]:

$$denoisedCr = \sum_{k=1}^{M \times M} \frac{WCr_k}{sumweightCr} \cdot Cr[k] \quad (5)$$

$$denoisedCb = \sum_{k=1}^{M \times M} \frac{WCb_k}{sumweightCb} \cdot Cb[k]$$

$WCr_k$ and $WCb_k$ differently weight the surrounding chrominances, according to equation (6):

$$WCr_k = e^{-\frac{1}{2}\left(\frac{|Y(k)-Y(c)|}{sigmaY}\right)} \cdot e^{-\frac{1}{2}\left(\frac{|Cr(k)-Cr(c)|}{sigmaCr}\right)} \quad (6)$$

$$sumweightCr = \sum_{k=1}^{M \times M} WCr_k$$

$$WCb_k = e^{-\frac{1}{2}\left(\frac{|Y(k)-Y(c)|}{sigmaY}\right)} \cdot e^{-\frac{1}{2}\left(\frac{|Cb(k)-Cr(c)|}{sigmaCb}\right)}$$

$$sumweightCb = \sum_{k=1}^{M \times M} WCb_k$$

SigmaY, sigmaCr and sigmaCb are the standard deviations of Y, Cr, and Cb, respectively, in the region L, and they determine the respective contribution of each plane (Y, Cr, and Cb) to the weights $WCr_k$ and $WCb_k$. These standard deviations could be set all to the same value, e.g., approximately 10, or to different values according to the respective noise levels of the chrominance channels. Here, c represents the position of the central pixel within the L neighborhood.

This means that the denoising process can be carried out by weighting more the pixels having both lower luminance and same-chrominance differences with the central pixel. So weights depend not only on the chrominance value to be corrected, but also on the luminance signal. The correction strength is modulated by the values of sigmaY, sigmaCr, sigmaCb and the window size M. Since chrominance noise seems to particularly affect the blue channel, different strengths of correction can be applied to the two chrominance planes. Specifically, a sigmaCb value greater than the sigmaCr value may be chosen. In this manner, blue noise can be effectively reduced, without desaturating genuine red details.

Figure 2:
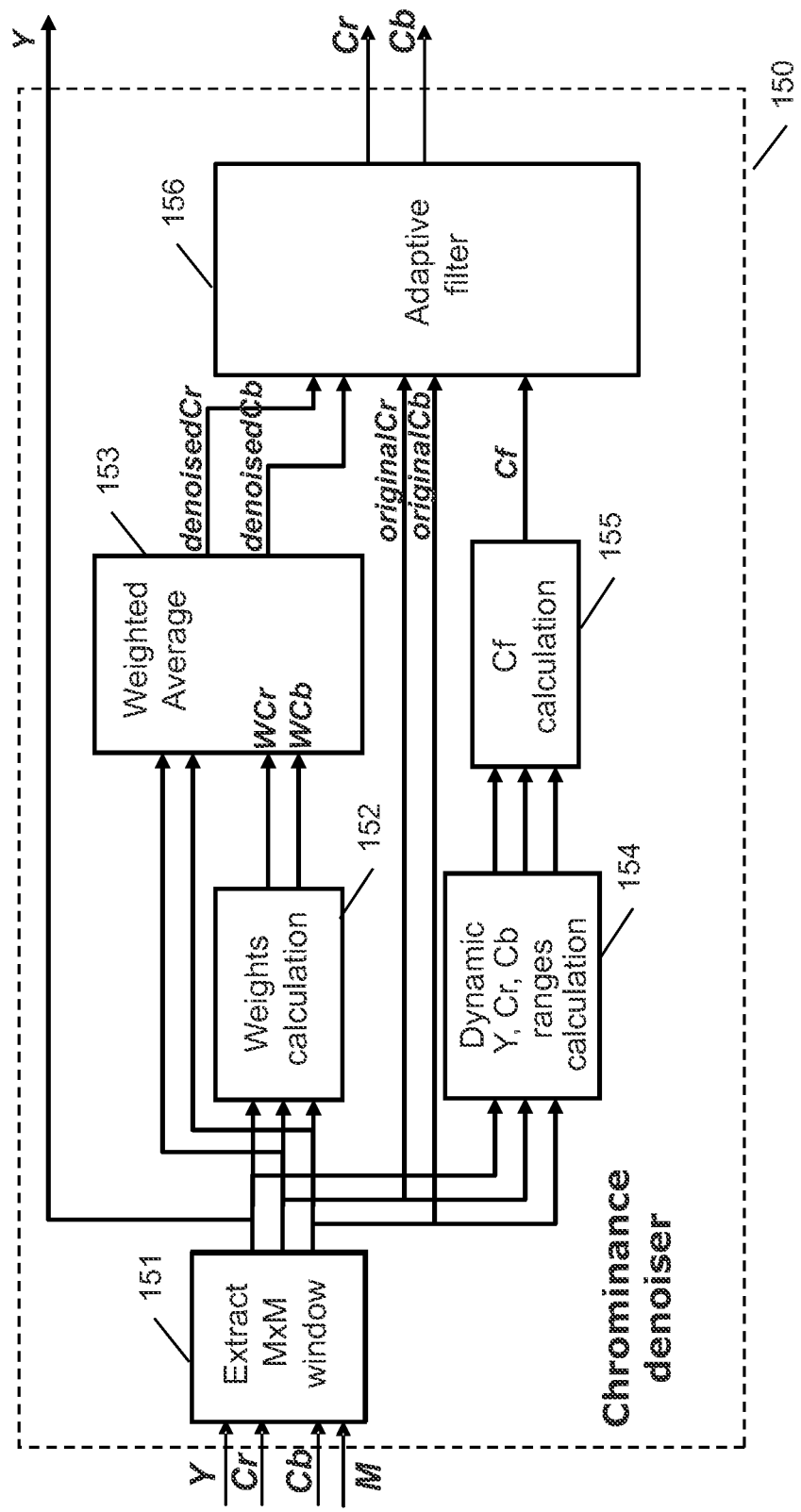
FIG. 2 is a detailed block diagram of the chroma-noise-reduction block in accordance with an embodiment.

FIG. 2 shows a block diagram of a chrominance denoiser in accordance with an embodiment. The chrominance denoiser receives digital image data in the form of a luminance signal Y and two color difference signals Cr and Cb (chrominance components), as well as information indicating a window size M for performing the filtering. In a first step, image data corresponding to an M×M window is extracted from the received image data by means of unit 151. Then, a denoised version of the chrominance signals is computed by the weighted-average computing unit 153 in accordance with the formula provided in Eq. (5). The weights WCr and WCb are computed in weights-calculation unit 152 in accordance with Eq. (6).

The strength of the denoising filter is modulated in accordance with the dynamic ranges of the luminance and the chrominance components. To this end, dynamic ranges of all image components are computed in a dynamic-range-calculation unit 154 in accordance with Eq. (1). The dynamic ranges are then fed to Cf-calculation unit 155, wherein parameter Cf is computed in accordance with Eq. (2). Finally, the adaptive-filter unit 156 generates filtered output chrominance components Cr and Cb by computing weighted sums of the original chrominance components and the denoised chrominance components in accordance with Eq. (3).

The chrominance components are filtered by adaptively weighting the contributions of both the original and the denoised chrominance values depending on the value of the Cf parameter. Denoised chrominance values are produced by the weighted-average calculation block 153, which weights the chrominance components in the surroundings of the central pixel according to the weights WCr and WCb, which are computed in the weights calculation block 152 per equation (6).

Figure 3:
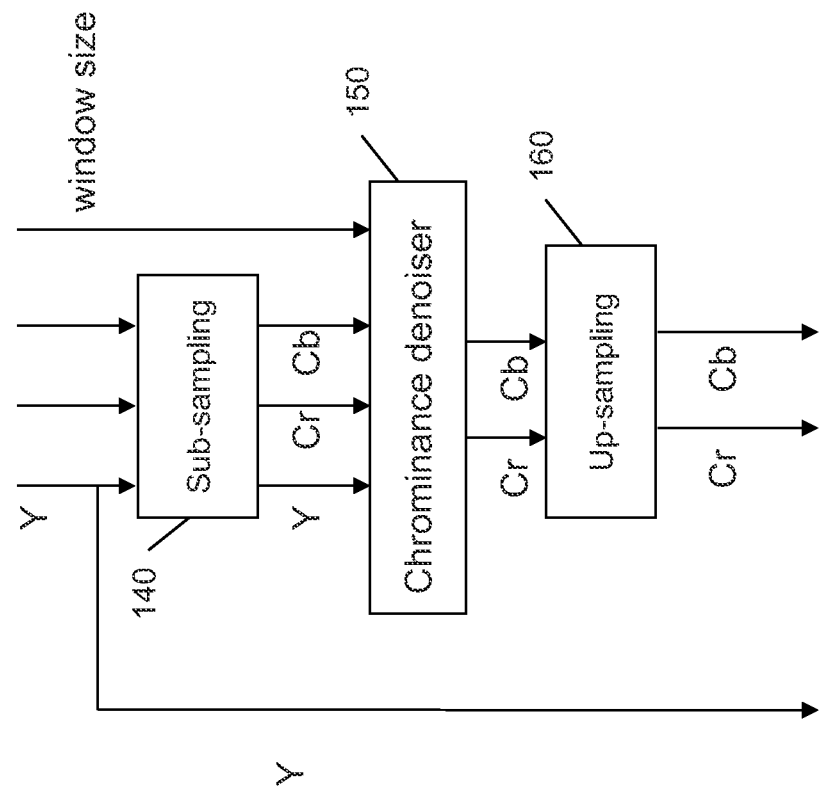
FIG. 3 is a block diagram of the chroma-noise-reduction system in accordance with another embodiment.

FIG. 3 is a block diagram of a chroma-noise-reduction system in accordance with another embodiment, where like elements are denoted by like reference numerals, and a repetition of their detailed explanation will be omitted for the sake of brevity.

As it has been mentioned above, color or "chroma" noise usually appears as low-frequency, colored blobs in regions of low spatial frequency. For this reason, large kernels may be required to effectively reduce it. In order to use smaller kernel sizes, luminance and chrominance signals may be firstly down-sampled by means of a sub-sampling unit 140 before the chrominance denoiser 150 is applied to down-sampled chrominance signals. The output of the chrominance denoiser 150 may then be up-sampled by means of an up-sampling unit 160, as needed.

Both the sub-sampling and up-sampling blocks 140 and 160 may be linked to the light value (exposure time, analogue gain, etc.), and they may use different techniques like down-scaling (up-scaling), complex interpolations, and sub-sampling (up-sampling). In an embodiment, they perform down-sampling and up-sampling by a factor of three in both image dimensions, respectively. However, other down- and up-sampling ratios, such as by a factor of two, may be employed as well.

Figure 4:
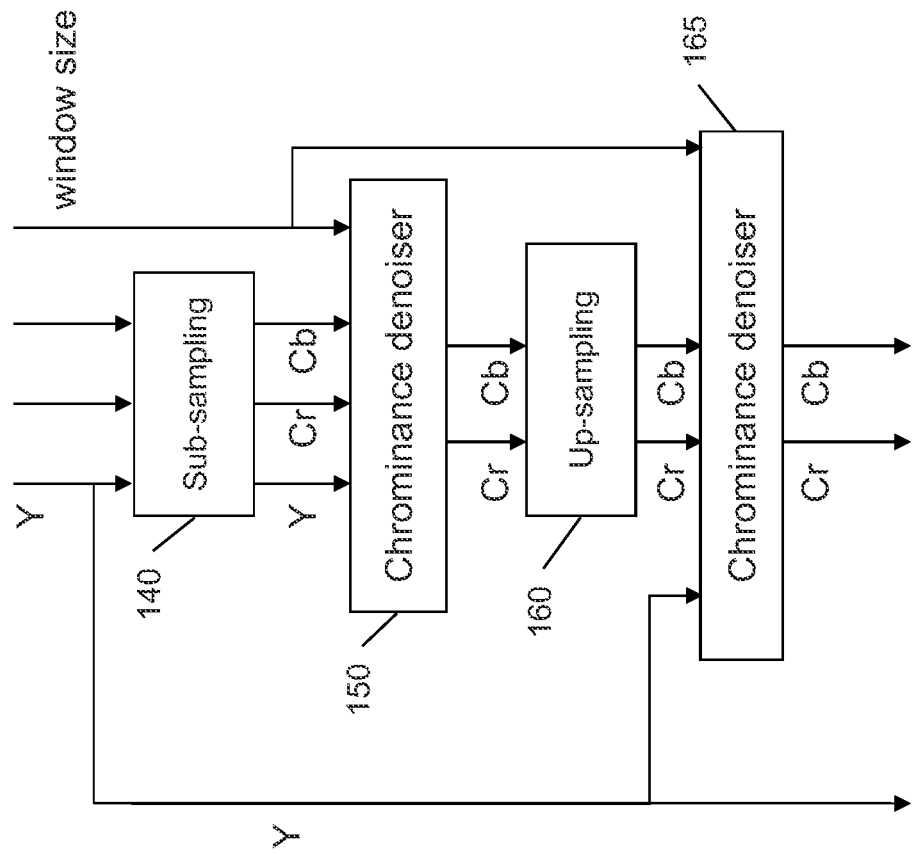
FIG. 4 is a block diagram of the chroma-noise-reduction system in accordance with yet another embodiment.

FIG. 4 is a block diagram of a chroma-noise-reduction system in accordance with yet another embodiment, where like elements are again denoted by like reference numerals, and a repetition of their detailed explanation will be omitted for the sake of brevity.

The denoising capability of the system is further improved by introducing another denoiser block 165 after the chrominance up-sampling, as it is shown in FIG. 4. In this manner, it is also possible to remove little colored blobs. The second denoiser block 165 may be the same physical block as the first block 150, or may be a different physical block that is configured the same as the first block (but different parameters, such as window size M, sigmaY, sigmaCr, and sigmaCb could be used for the second denoiser block as compared to the first denoiser block).

An embodiment provides an architectural solution that is capable of efficiently removing chroma blobs from digital images without causing color bleeding artifacts. Since chroma noise is generally more pronounced in dark regions than in bright regions, the strength of the denoising filter may be modulated in accordance with the exposure time and/or the intensity value. In addition, an embodiment allows setting different correction strengths for the two chrominance planes. This may be advantageous, because chroma noise may affect the blue channel more severely than the red channel.

An embodiment tackles the problem of chroma noise at the luminance/chrominance level, i.e., after demosaicing and color interpolation. This approach may also be supplemented with an additional chroma-noise-reduction stage/step at the CFA (color filter array) level, i.e., before demosaicing and color interpolation. Such a method for chroma-noise-reduction at the CFA level is disclosed in co-pending application U.S. patent application Ser. No. 13/421,799, which is incorporated by reference.

In summary, an embodiment is a method for reducing chroma noise in digital image data and a corresponding image processor. Chrominance components are subjected to low-pass filtering. The strength of the low-pass filtering is modulated in accordance with the dynamic range of the luminance signal and the dynamic range of each of the two chrominance signals in order to avoid color bleeding at image-object edges. Moreover, the low-pass filtering may be selectively applied to pixels with similar luminance and chrominance values only. A combination of down-sampling and up-sampling units is employed so that comparatively small filter kernels may be used for removing chroma noise with low spatial frequency.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. An apparatus, comprising:
a dynamic range calculation circuit configured to determine first and second dynamic ranges of first and second chrominance signals representing respectively first and second chrominance planes of a plurality of pixels in an image, and further configured to determine a dynamic range of a luminance signal representing luminance of the plurality of pixels;
a filter circuit configured to low pass filter the first chrominance signal and generate a low pass filtered first chrominance signal;
a weighting coefficient calculation circuit configured to compute a weighting coefficient on the basis of the dynamic ranges of the first chrominance signal, the second chrominance signal, and the luminance signal; and
a weighted sum calculation circuit configured to generate a first output chrominance signal by computing a weighted sum of the first chrominance signal and the low pass filtered first chrominance signal using the computed weighting coefficient;
wherein the filter circuit is further configured to compute a weighted average of the first chrominance signal within a neighborhood of a central pixel, each weight of the weighted average being a decreasing function of a difference between a luminance of a respective pixel within the neighborhood and a luminance of the central pixel, and being a decreasing function of a difference between a first chrominance plane of the respective pixel and a first chrominance plane of the central pixel and to set the computed weighted average, as the low-pass filtered first chrominance signal for the central pixel.

2. The apparatus of claim 1 wherein:
wherein the weighting coefficient calculation circuit is configured to compute the weighting coefficient by applying:
a decreasing function to the dynamic range of the luminance signal if the dynamic range of the luminance signal is smaller than the dynamic range of the first chrominance signal and the second chrominance signal, and
the decreasing function to the maximum of the dynamic range of the luminance signal, the first chrominance signal, and the second chrominance signal if the dynamic range of the luminance signal is not smaller than the dynamic range of the first chrominance signal or the second chrominance signal; and
wherein the weighted sum is computed by the low pass filtered first chrominance signal the computed weighting coefficient.

3. The apparatus of claim 1 wherein the filter circuit is further configured to set a size of the neighborhood of the central pixel on the basis of at least one of an ISO setting, an exposure time, a luminance of the central pixel, and an average luminance of pixels adjacent to the central.

4. The apparatus of claim 1 wherein the decreasing function is a sigmoidal function with values between zero and one.

5. The apparatus of claim 1 further comprising:
down-sampling circuit configured to down-sample the luminance signal and the first chrominance signal and the low-pass filter configured to filter the down-sampled first chrominance signal; and
an up-sampling circuit configured to up-sample the filtered down-sampled first chrominance signal to generate the low pass filtered first chrominance signal.

6. The apparatus of claim 1 further comprising a second filter unit for applying a denoising filter to the up-sampled signal to obtain the low-pass filtered first chrominance signal.

7. A system, comprising:
a first integrated circuit, including
dynamic range calculation circuit configured to determine first and second dynamic ranges of first and second chrominance signals representing respectively first and second chrominance planes of a plurality of pixels in an image, and further configured to determine a dynamic range of a luminance signal representing luminance of the plurality of pixels;
a filter circuit configured to low pass filter the first chrominance signal and generate a low pass filtered first chrominance signal
a weighting coefficient calculation circuit configured to compute a weighting coefficient on the basis of the dynamic ranges of the first chrominance signal, the second chrominance signal, and the luminance signal; and
a weighted sum calculation circuit configured to generate a first output chrominance signal by computing a weighted sum of the first chrominance signal and the low pass filtered first chrominance signal using the computed weighting coefficient; and
a second integrated circuit coupled to the first integrated circuit;
wherein the filter circuit is further configured to compute a weighted average of the first chrominance signal within a neighborhood of a central pixel, each weight of the weighted average being a decreasing function of a difference between a luminance of a respective pixel within the neighborhood and a luminance of the central pixel, and being a decreasing function of a difference between a first chrominance plane of the respective pixel and a first chrominance plane of the central pixel and to set the computed weighted average, as the low-pass filtered first chrominance signal for the central pixel.

8. The system of claim 7 wherein the first and second integrated circuits are disposed on a same integrated-circuit die.

9. The system of claim 7 wherein the first and second integrated circuits are disposed on respective integrated-circuit dies.

10. The system of claim 7 wherein:
the first integrated circuit includes an image processor; and
the second integrated circuit includes a pixel array configured to capture the image and to provide the image to the first integrated circuit.

11. A method for reducing chroma noise in digital image data, the method comprising:
- receiving a luminance signal representing luminance of a plurality of pixels;
- receiving a first chrominance signal representing a first chrominance plane of the plurality of pixels;
- receiving a second chrominance signal representing a second chrominance plane of the plurality of pixels;
- determining a dynamic range of the first chrominance signal, a dynamic range of the second chrominance signal, and a dynamic range of the luminance signal;
- applying a low-pass filter to the first chrominance signal;
- computing a weighting coefficient on the basis of the dynamic ranges of the first chrominance signal, the second chrominance signal, and the luminance signal; and
- generating a first output chrominance signal by computing a weighted sum of the received first chrominance signal and the low-pass filtered first chrominance signal, on the basis of the computed weighting coefficient;
- wherein applying the low-pass filter to the first chrominance signal further comprises:
- computing a weighted average of the first chrominance signal for pixels within a neighborhood of a central pixel, each weight of the weighted average being a decreasing function of a difference between a luminance of a respective pixel within said neighborhood and a luminance of the central pixel, as well as a decreasing function of a difference between a first chrominance plane of the respective pixel and a first chrominance plane of the central pixel; and
- setting the computed weighted average as the low-pass filtered first chrominance signal for the central pixel.

12. The method of claim 11 wherein the weighting coefficient is computed by applying a decreasing function to the dynamic range of the luminance signal, if the dynamic range of the luminance signal is smaller than the dynamic range of the first chrominance signal and the second chrominance signal, and by applying the decreasing function to the maximum of the dynamic range of the luminance signal, the first chrominance signal, and the second chrominance signal, if the dynamic range of the luminance signal is not smaller than the dynamic range of the first chrominance signal or the second chrominance signal;
- wherein the weighted sum is computed by weighting the low-pass filtered first chrominance signal with the computed weighting coefficient.

13. The method of claim 11 further comprising setting a size of the neighborhood of the central pixel on the basis of at least one of an ISO setting, an exposure time, a luminance of the central pixel, and an average luminance of pixels adjacent to the central pixel.

14. The method of claim 11 wherein the decreasing function is a sigmoidal function with values between zero and one.

15. The method of claim 11 further comprising:
- down-sampling the received luminance signal and the received first chrominance signal;
- applying the low-pass filter to the down-sampled first chrominance signal; and
- up-sampling the low-pass filtered signal to obtain the low-pass filtered first chrominance signal.

16. The method of claim 15 further comprising applying a denoising filter to the up-sampled signal to obtain the low-pass filtered first chrominance signal.

* * * * *

UNITED STATES PATENT AND TRADEMARK OFFICE
CERTIFICATE OF CORRECTION

| | | |
|---|---|---|
| PATENT NO. | : 9,135,681 B2 | Page 1 of 1 |
| APPLICATION NO. | : 13/608783 | |
| DATED | : September 15, 2015 | |
| INVENTOR(S) | : Valeria Tomaselli et al. | |

It is certified that error appears in the above-identified patent and that said Letters Patent is hereby corrected as shown below:

Title Page

Page 2, column 1, Item (56):
"WO   03/051035 A1   3/2015" should read, --WO   03/051035 A1   6/2003--.

In the Claims

Column 10, Line 12:
"down-sampling circuit configured to down-sample the" should read, --a down-sampling circuit configured to down-sample the--.

Column 10, Line 24:
"dynamic range calculation circuit configured to" should read, --a dynamic range calculation circuit configured to--.

Column 10, Line 33:
"first chrominance signal" should read, --first chrominance signal;--.

Signed and Sealed this
Fifteenth Day of March, 2016

Michelle K. Lee
*Director of the United States Patent and Trademark Office*